United States Patent [19]
Hershey

[11] Patent Number: 5,811,690
[45] Date of Patent: Sep. 22, 1998

[54] DIFFERENTIAL PRESSURE TRANSMITTER WITH HIGHLY ACCURATE TEMPERATURE COMPENSATION

[76] Inventor: George E. Hershey, 385 Wood Dr., Blue Bell, Montgomery County, Pa. 19422

[21] Appl. No.: 822,198

[22] Filed: Mar. 20, 1997

[51] Int. Cl.⁶ .............................. G01F 1/38; G01F 23/14
[52] U.S. Cl. ........................................ 73/861.42; 73/299
[58] Field of Search ........................... 73/861.42, 861.01, 73/708, 299; 364/557, 558

[56] References Cited

U.S. PATENT DOCUMENTS

| | | | |
|---|---|---|---|
| 4,598,381 | 7/1986 | Cucci | 73/708 |
| 5,307,683 | 5/1994 | Phelps et al. | 73/708 |

*Primary Examiner*—George M. Dombroske
*Assistant Examiner*—Harshad Patel
*Attorney, Agent, or Firm*—Anthony Miologos

[57] ABSTRACT

A remote seal differential pressure transmitter, when installed with its remote seal separated by a vertical distance, has an accurate output signal which is compensated for all temperature effects, including compensation of the sensors' temperature characteristics and compensation of the remote seals' temperature characteristics. Compensation for the remote seals' temperature characteristics must include compensation for the expansion and contraction of the translation fluid used in the remote seals and compensation for changes in density of the translation fluid. The changes in density and the installed height of remote seals specifically create a height/temperature error which must be compensated for when the temperature changes.

13 Claims, 4 Drawing Sheets

DIFFERENTIAL PRESSURE TRANSMITTER WITH HIGHLY ACCURATE TEMPERATURE COMPENSATION

BACKGROUND OF INVENTION

The present invention relates to a differential pressure sensor for use in various manufacturing applications. More specifically, the invention provides an extremely accurate differential pressure sensor which is compensated for all temperature related errors.

Differential pressure sensors are widely known in the art for use in many manufacturing applications. These sensors typically measure pressure drops across certain structures such as valves, orifices, etc. As is well known by those skilled in the art of manufacturing, changes in pressure are generally critical to the manufacturing process.

One common type of differential pressure sensor has two integral diaphragms, each exposed to a process medium (a fluid or gas which is part of the manufacturing process). A silicon sensor is placed between the two diaphragms which is sensitive to the movement or position of the diaphragms. The silicon sensor can then create an electrical signal indicative of the difference in pressure applied to the two diaphragms. This electrical signal can then be used by many other devices, including displays, process control computers and instrumentation, closed loop control systems etc. In many present day applications, this electronic signal can take the form of either an analog signal or a digital signal, depending on the requirements of the application. As mentioned, the differential pressure sensors can be used in such applications as: (1) process flow measurements, (2) liquid level determinations, and (3) fluid density determinations.

Many times it becomes necessary to measure differential pressure changes across many different points in a process or processing plant. The two points across which the differential pressure must be measured may be physically separated by large distances. This physical limitation creates a need to place sensors a very large distance from one another. One example of such an application is the measurement of fluid flow through a tank. On a large tank, it is necessary to place one sensor on an upper portion of the tank while a second sensor is placed on a lower portion of the tank.

To accomplish these applications where it is necessary to measure pressure differences between two points which are physically separated by a large distance, remote diaphragm seals are utilized. A remote diaphragm seal is essentially a pressure sensitive metallic diaphragm which is housed in a mounting structure. Attached to the backside of this metallic diaphragm is a capillary tube which carries a translation fluid. The other end of this capillary tube is attached to the integral diaphragms within the typical differential pressure sensor. Filling the capillary tube with a liquid allows pressure exerted on the remote diaphragm seal to be transmitted via the fluid to the integral diaphragm. If two remote diaphragm seals and associate capillary tubes are attached to either side of the integral diaphragms, the differential pressure sensor is then capable of measuring pressure differences across large distances. In summary, pressures are transmitted via the fluid from the remote diaphragm seals to the integral diaphragms. The differential pressure is then determined by a silicon sensor within the device.

Typically, a differential pressure sensor is packaged within a differential pressure transmitter which allows the differential pressure signal to be transmitted to other devices. An example of these devices is the ST3000 Smart Transmitter with Remote Diaphragm Seals (Series 100) manufactured by Honeywell Inc. of Minneapolis, Minn. The aforementioned electronic signal which is indicative of pressure differences can easily be received by electronics within the transmitter and converted into a usable signal. This usable signal could be either analog or digital, depending on the system requirements. Electronics within the transmitter package may also be necessary to transform the signal to meet the requirements of a particular system. For example, electronics may be necessary to convert the signal to meet an appropriate scale factor requirement or may be necessary to adjust a bias level.

Also included within many pressure transmitter packages is a temperature sensor. As one may suspect, these devices are very sensitive to changes in ambient temperature. Furthermore, these devices are typically used in very volatile environments where extreme changes in temperature can be expected. The integral temperature sensor can be used to adjust for errors created by changes in temperature.

Furthermore, the transmitter package may also include a static pressure sensor which would adjust differential pressure changes which may be caused by changes in static pressure.

Temperature compensation in pressure transmitters becomes very important as errors caused by temperature changes can get very large. Temperature errors are created due to the structure of the sensor and the entire transmitter package. Being a physical device which expands and contracts as the temperature changes, the sensor itself is inherently temperature sensitive. The silicon sensor is also typically temperature sensitive. All of the temperature sensitivities can easily be corrected through appropriate designs, which physically minimize the effects of temperature, and compensation networks. Compensation networks are easily implemented in electronics associated with the sensor.

Those skilled in the art also recognize that the use of capillary tubes filled with a fluid create a temperature sensitivity. Fluids have well known coefficients of thermal expansion characterizing their changes in volume over changes in temperature. These changes in volume create false pressures on the adjacent diaphragms and consequently induce an error into the sensed differential pressure signal. Again, these fluid/temperature errors are easily compensated through electronics associated with the transmitter package.

As previously mentioned, one application of these sensors (the measurement of liquid levels in a closed tank) requires the remote seals to be separated by a vertical height. However, this vertical separation creates a third temperature sensitive error which is presently not compensated for. This temperature sensitive error, however, only occurs in applications where a vertical height separates the two sensors.

When the remote seals are separated by a vertical height, a height effect or height error is inherent in the uncorrected sensor output. This height error is caused by the weight of the translation fluid exerting a pressure on the sensor. Specifically, the height error is equal to the specific gravity of the translation fluid multiplied by the vertical height. Once the sensor has been installed, the height error is then treated as a constant—because the installed height will not change—which is then removed from the sensor output.

However, the height error is also sensitive to temperature and is not accounted for in the sensor output. Changes in temperature create a change in fluid density and a corresponding change in the specific gravity of the fluid (i.e. the fluid becomes slightly heavier or lighter). This change in specific gravity, coupled with the vertical separation of the two sensors, also creates a change in differential pressure (a height/temperature error). When the installed height of the two remote sensors is fairly high, the height/temperature error can be fairly large, resulting in inaccuracy in the transmitter output.

SUMMARY OF THE INVENTION

The present invention provides for compensation of height/temperature errors. As mentioned, the height effect creates an error in the uncorrected sensor output which must be corrected. This correction is easily done by considering the vertical height or separation of the remote seals and the specific gravity of the translation fluid within the capillary tubes. Using this information, the error in the differential pressure output due to this height effect can easily be determined and taken out of the output signal.

The present invention recognizes that as temperature changes, the specific gravity of the translation fluid also changes. As a result of this change in specific gravity, the height error will also change over temperature. The present invention utilizes a temperature sensor to correct for this height/temperature error. The temperature sensor, in conjunction with known characteristics of the translation fluid, allows for easy correction of the height error as the temperature changes.

In operation, the present invention is utilized to create a highly accurate differential pressure signal. Specifically, the present invention creates this highly accurate signal in applications involving a vertical separation between the remote seals. One such application is the measurement of fluid flow through a very large tank. In this application, one remote seal is located at an upper portion of the tank while a second remote seal is located at a lower portion of the tank. Initially, the transmitter is calibrated for its particular application to take into account the vertical separation of the remote seals, the properties of the translation fluid, and the temperature effects of the differential pressure sensor.

As is well known, the remote seals are connected via a capillary tube to a differential pressure sensor. Within the capillaries is a translation fluid which allows pressure sensed by the remote seal to be translated to the internal pressure sensor diaphragm. Within the pressure sensor is a pair of diaphragms and a silicon sensor situated therebetween. As the pressure sensor diaphragms are exposed to different pressures or pressure levels, a signal is created by the silicon sensor which is indicative of the difference between these two pressure signals. By having a first remote seal connected to a first sensor diaphragm and a second remote seal connected to a second diaphragm via appropriate capillary tubes, pressure levels a large distance apart can be determined.

As with most physical devices, changes in temperature can drastically affect performance and accuracy. In the transmitter of the present invention, this is also true. These temperature effects take numerous forms which include: (1) a sensor/temperature error, (2) a remote seals/temperature error, and (3) a height/temperature error.

The sensor/temperature error accounts for all changes in the sensor itself due to changes in temperature. As is well known, all physical devices expand and contract as temperature changes. This can have various effects on the function of these devices. Generally speaking, these temperature effects are minimized where possible and then can also be characterized over various temperature ranges. When characterized, the temperature effects can be corrected through appropriate processing.

Remote seals/temperature error accounts for the temperature sensitivity created by remote seals. The capillary tubes are filled with translation fluid which also contracts and expands over temperature, thus creating the remote seals/temperature error. Specifically, one of the capillary tubes may contain more fluid than the other tube and thus will expand or contract more. This difference in expansion or contraction will create the remote seals/temperature error.

Lastly, as previously mentioned, when the remote seals are separated by a vertical height, a height/temperature error is created. This height/temperature error is a recognition of the change in density of the translation fluid over temperature and the vertical separation of the remote seals.

By correcting for all three of the above mentioned temperature errors, the present invention creates a differential pressure transmitter for sensing differential pressures which is very accurate in all applications.

It is an object of the present invention to create a remote pressure transmitter which is free of errors caused by all temperature effects. This includes a sensor which corrects for sensor/temperature effects, remote seals/temperature effects, and height/temperature effects.

It is a further object of the present invention to create a pressure sensor for use in applications requiring remote seals to be separated by a vertical distance. By recognizing this vertical separation and changes in temperature create numerous errors, and subsequently correcting for these errors, a highly efficient and accurate system is created.

BRIEF DESCRIPTION OF THE DRAWINGS

Further objects and advantages of the present invention can be seen by reading the following detailed description in conjunction with the drawings in which.

DETAILED DESCRIPTION OF THE INVENTION

Figure 1:
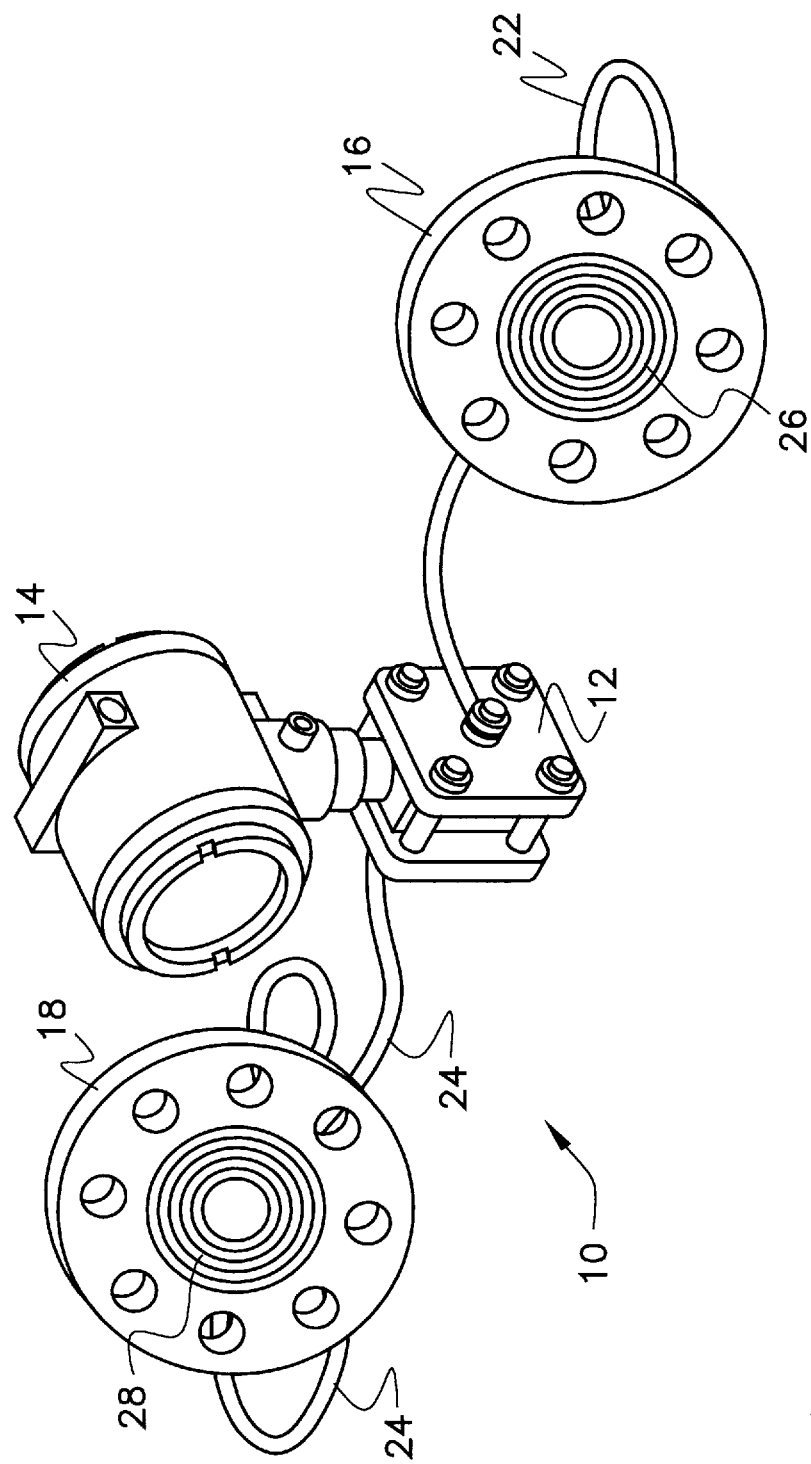
FIG. 1 is a perspective view of the remote seal pressure transmitter of the present invention.

Referring now to FIG. 1 there is shown a perspective view of the remote seal pressure transmitter 10 of the present invention. As mentioned, the general function of this device is to sense the differential pressure between two points and produce a signal indicative of this differential pressure. Remote seal pressure transmitter 10 consists of a pressure sensing unit, or differential pressure sensor 12 processing electronics or processor 14, a first remote seal 16 and a second remote seal 18.

First remote seal 16 is connected to differential pressure sensor 12 via a first pressure connector or capillary tube 22. Similarly, second remote seal 18 is connected to differential pressure sensor 12 via a second pressure connector or capillary tube 24. Through this structure, the first remote seal can be placed at a first measurement point or measurement location while second remote seal 18 can be placed at a second measurement point or measurement location and the differential pressures between these two locations can be determined.

Remote seal 16 has a remote diaphragm 26 which is sensitive to pressure. Similarly, second remote seal 18 has a remote diaphragm 28 integral therewith which is sensitive to pressure. When in use, the pressure sensed by remote diaphragm 26 is translated via first capillary tube 22 to differential pressure sensor 12. Also, the pressure sensed by remote diaphragm 28 is transmitted to differential pressure sensor 12 via second capillary tube 24. Both first capillary tube 22 and second capillary tube 24 are closed devices filled with a translation fluid. The pressure exerted on remote diaphragm 26 is translated through this translation fluid to differential pressure sensor 12.

Figure 4:
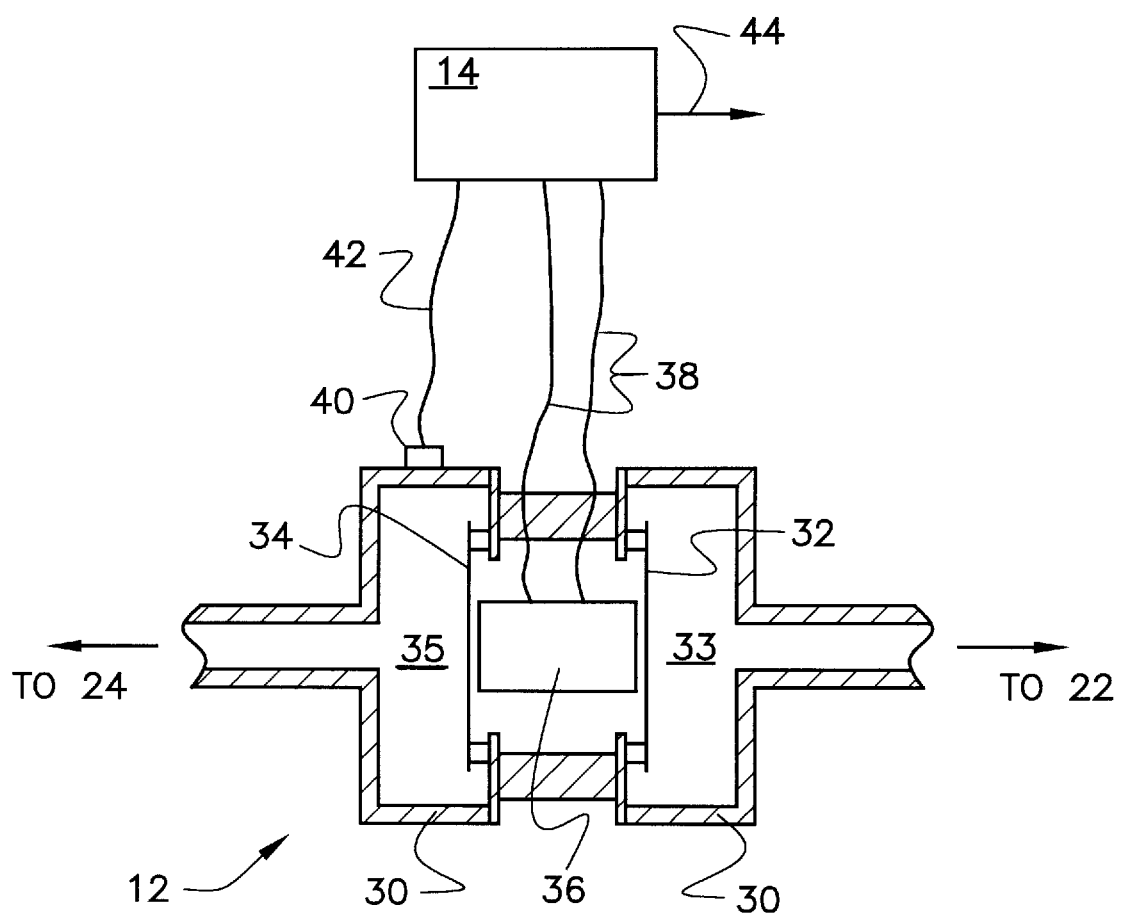
FIG. 4 is a detailed cross-sectional diagram of a differential pressure sensor utilized by the present invention.

Referring now to FIG. 4, Differential pressure sensor 12 contains two pressure sensitive portions, a first pressure sensitive portion or first sensor diaphragm 32 and a second pressure sensitive portion or second sensor diaphragm 34. These portions are located within the sensor housing 30 such that they communicate with first and second capillary tubes 22 and 24. In this configuration, first pressure sensitive portion 32 can be exposed to a first pressure level at first input 33, while second pressure sensitive portion 34 can be exposed to a second pressure level at second input 35. Situated between first pressure sensitive portion 32 and second pressure sensitive portion 34 is a silicon sensor 36 which senses the pressure differential between the first pressure level and the second pressure level. Silicon sensor 36 then produces an uncorrected differential pressure signal 38 which is indicative of the sensed differential pressure. Uncorrected differential pressure signal 38 is not corrected for any temperature effects within the package. Also attached to differential pressure sensor 12 is a temperature sensor 40. Temperature sensor 40 has an output 42 which is indicative of the temperature.

Uncorrected differential pressure signal 38 and temperature sensor output 42 are both attached to a temperature correcting apparatus, or processor 14. As discussed more fully below, processor 14 will then produce a corrected differential pressure signal 44.

There are many types of differential pressure sensors which could be used in this application. It is well understood by those skilled in the art that they could take on many different configurations and forms. However, all uniformly create a standard differential pressure signal.

Figure 2:
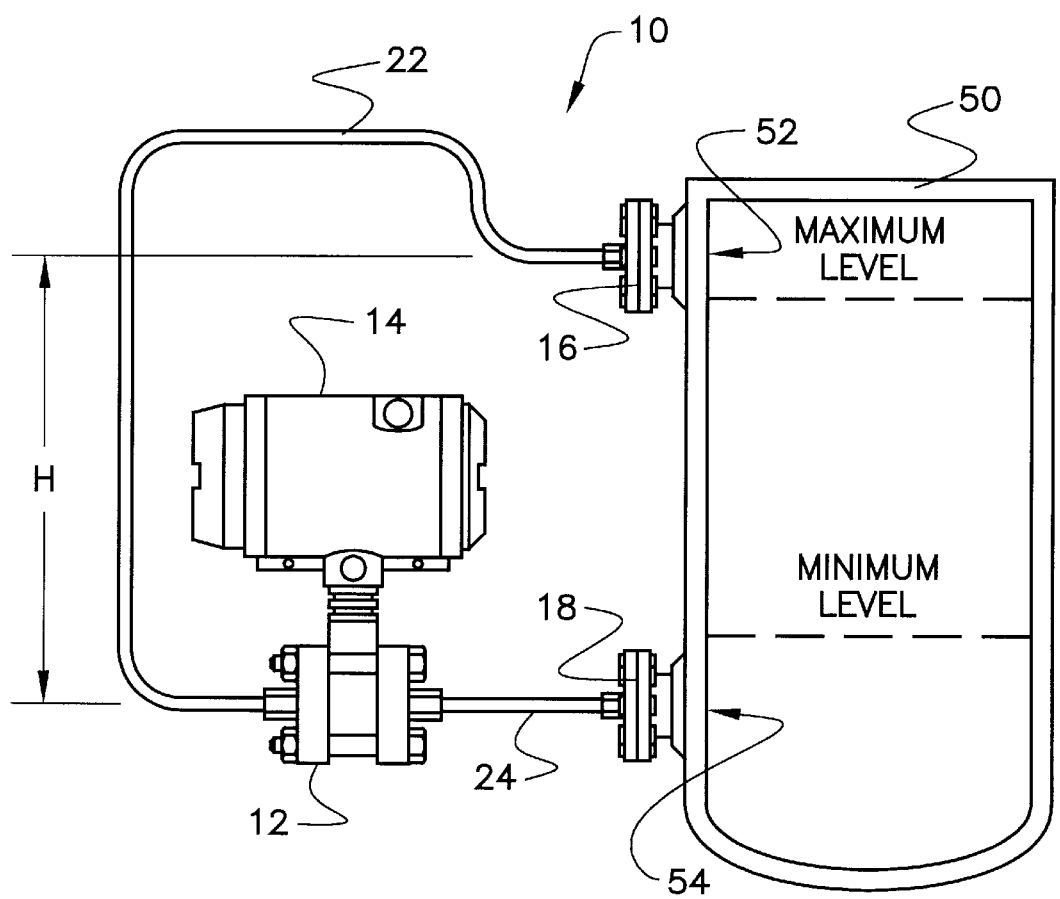
FIG. 2 is an application drawing showing the pressure transducer and remote seals installed to measure the fluid levels within a tank.

Referring now to FIG. 2, there is shown the remote seal pressure transmitter 10 installed on a fluid tank 50 for measuring the liquid level within the tank. As can be seen, first remote seal 16 is attached to fluid tank 50 at a first measurement point or measurement level 52. Similarly, second remote seal 18 is attached to fluid tank 50 at a second measurement point or measurement level 54. First remote seal 16 and second remote seal 18 are installed at a height or vertical separation H from one another. In this application, the difference in pressure between first measurement point 52 and second measurement point 54 is indicative of the fluid level within the tank. This information can be used in controlling many manufacturing processes.

As illustrated in FIG. 1, first remote seal 16 is attached to differential pressure sensor 12 via first capillary tube 22. Similarly, second remote seal 18 is attached to differential pressure sensor 12 via second capillary tube 24. Due to the height differences between first remote seal 16 and second remote seal 18, a height bias or height error is created in this system. More specifically, the weight of the fluid in first and second capillary tubes 22 and 24 creates a pressure differential at differential pressure sensor 12. This differential pressure caused by height is equal to the installed height H multiplied by the specific gravity of the translation fluid. Stated alternatively, this height error is described by the following equation:

$$\text{Height Error} = H * SG$$

where:

H is the installed height separation, and

SG is the specific gravity of the fluid.

As is well known, all devices are somewhat sensitive to changes in temperature. Therefore, to create an efficient device which operates over a wide range of temperatures, all temperature variations must be accounted for. Generally speaking, the transmitter of the present invention has three major temperature effects or temperature errors which must be accounted for. These three temperature effects include: (1) sensor/temperature effects, (2) remote seals/temperature effects, and (3) height/temperature effects. Each of these temperature effects will be described in conjunction with the present invention's process for compensating or correcting the effects.

Figure 3:
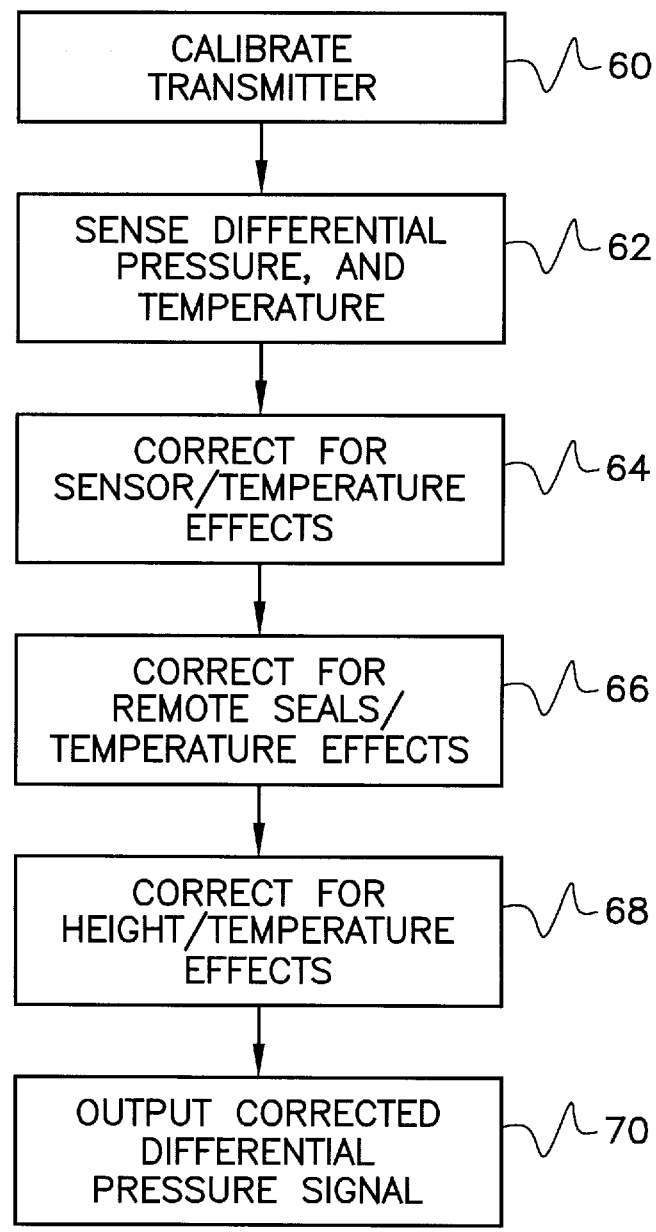
FIG. 3 is a flow chart outlining the steps the present invention undertakes to correct for all temperature effects.

Referring to FIG. 3, there is shown a process for performing the measurement operations carried out by the present invention. Initially, it is necessary to calibrate the transmitter in step 60. This calibration may include many different operations but at least should include a characterization of the transmitter, an input of the installed height H for the transmitter, and an input of the fluid characteristics of the translation fluid. The process then moves on to step 62 wherein the differential pressure and temperature are both sensed. In this step, the electronics will determine the uncorrected differential pressure signal by communicating with silicon sensor 36 and will determine the ambient temperature by communicating with the temperature sensor. The ambient temperature can be used to indicate the actual translation fluid temperature.

Next, the system moves on to step 64 wherein sensor/temperature errors a recorrected for. Correction of sensor/temperature errors involve correcting the output of the differential pressure sensor 12 for thermal effects inherent in the sensor itself. The thermal effects of the sensor must be stored or characterized prior to this operation taking place. Typically this accounts for expansions and contractions of the different pieces of the invention.

Next, the system accounts or corrects for remote seal/temperature errors in step 66. These remote seal/temperature errors result from the fact that first capillary tube 22 and second capillary tube 24 both are filled with translation fluid. The translation fluid will have some coefficient of thermal expansion (or CTE). Therefore, as temperature changes, the fluid within first capillary tube 22 and second capillary tube 24 will expand or contract accordingly. This expansion or contraction creates the remote seal/temperature error in the differential pressure sensor output The present invention recognizes this error exists and will remove the error from the sensor output.

As previously stated, the remote seals of the present invention are installed a vertical height H from one another. This arrangement creates a height error which must always be accounted for. Furthermore, as temperature changes, this height error itself will also change creating a height/temperature error. As is well known, fluid density changes as the temperature changes. This change in density also causes the specific gravity of the fluid to change. Because the height error is dependent upon the fluid specific gravity, this height error will also change as temperature changes. The present invention takes into account this change by calculating the change in fluid specific gravity and adjusting the height error accordingly. Essentially the height/temperature error is equal to the change in specific gravity multiplied by the installed height H. Stated another way, the height/temperature error can be expressed as:

$$H/T(t) = H * SG(t)$$

where:

H/T(t)=the height/temperature error as a function of temperature t=temperature

H=installed height, and

SG(t)=specific gravity of the translation fluid as a function of temperature

Following the correction of the uncorrected differential pressure signal for all of these errors, a corrected differential pressure signal is output by electronics 14 for use by other devices. These other devices may include gages or display devices, control systems, data collection systems, or various computers. This information can then be used by an overall control system or control computer to efficiently and effectively control many different processes.

Having illustrated and described the principles of the invention in the preferred embodiment, it should be apparent to those skilled in the art that the invention can be modified in arrangement and detail without departing from such principles. We claim all modifications within the scope and spirit of the following claims.

What is claimed:

1. A remote diaphragm seal pressure transmitter for measuring a differential pressure across a first measurement point and a second measurement point, wherein the first and second measurement points are separated by a vertical distance, of a specific height the transmitter comprising:

a pressure sensing unit having a first pressure sensitive portion and a second pressure sensitive portion for determining a differential pressure across the first pressure sensitive portion and the second pressure sensitive portion and producing an uncorrected differential pressure signal indicative of the differential pressure;

a first remote seal for sensing pressure at the first measurement point, the first remote seal attached to the pressure sensing unit by a first pressure connector such that pressures sensed by the first remote seal are translated to the first pressure sensitive portion, wherein the first pressure connector is filled with a pressure transmitting medium;

a second remote seal for sensing pressure at the second measurement point, the second remote seal attached to the pressure sensing unit by a second pressure connector such that pressures sensed by the second remote seal are translated to the second pressure sensitive portion, wherein the second pressure connector is filled with the pressure transmitting medium;

a temperature sensor associated with said pressure sensing unit for producing a temperature signal indicative of the ambient temperature, and a processor for receiving the uncorrected differential pressure signal and the temperature signal and producing a corrected differential pressure signal by:

a) correcting the uncorrected differential pressure signal for a sensor error with respect to temperature caused by the temperature sensitivity of the pressure sensing unit;

b) correcting the uncorrected differential pressure signal for a remote seal error with respect to temperature error caused by the temperature sensitivities of the first remote seal and the second remote seal; and c) correcting the uncorrected differential pressure signal for a height error with respect to temperature caused by changes in temperature.

2. The pressure transmitter of claim 1 wherein the pressure transmitting medium is a fluid.

3. The pressure transmitter of claim 2 wherein the fluid changes its density with changes in temperature, thus the specific gravity of the fluid also changes.

4. The pressure transmitter of claim 3 wherein the height error with respect to temperature errors are equal to the vertical distance between the first measurement point and the second measurement point times the change in the fluid specific gravity.

5. The pressure transmitter of claim 1 wherein the first pressure connector and the second pressure connector are capillary tubes.

6. The pressure transmitter of claim 1 wherein the processor further comprises an output wherein the corrected differential signal is presented to the output for transmission to an external device.

7. The pressure transmitter of claim 1 wherein the first and second measurement points are on an upper portion and a lower portion of a closed tank, and the corrected differential pressure signal is indicative of the tank's fluid level.

8. The pressure transmitter of claim 1 wherein the first remote seal has a first remote diaphragm exposed to the pressure being sensed and in communication with the pressure transmitting medium.

9. The pressure transmitter of claim 1 wherein the second remote seal has a second remote diaphragm exposed to the pressure being sensed and in communication with the pressure transmitting medium.

10. A remote diaphragm seal pressure transmitter for measuring a differential pressure across a first measurement point and a second measurement point and producing a corrected differential pressure signal indicative of the differential pressure, wherein the first and second measurement points are separated by a vertical distance, of a specific height the transmitter comprising:

a differential pressure sensor having a first sensor diaphragm and a second sensor diaphragm, the differential pressure sensor for sensing a differential pressure between the first sensor diaphragm and the second sensor diaphragm and producing an uncorrected pressure signal indicative of the differential pressure;

a first remote seal positioned at the first measurement point having a first remote diaphragm sensitive to pressure;

a first capillary tube filled with a pressure transmitting fluid and connected between the differential pressure sensor and the first remote seal such that pressures sensed by the first remote diaphragm are translated to the first sensor diaphragm via the translation fluid;

a second remote seal positioned at the second measurement point having a second remote diaphragm sensitive to pressure;

a second capillary tube filled with the pressure transmitting fluid and connected between the differential pressure sensor and the second remote seal such that pressures sensed by the second remote diaphragm are translated to the second sensor diaphragm via the pressure transmitting fluid;

a temperature sensor associated with said pressure sensing unit for producing a temperature signal indicative of the ambient temperature;

a temperature compensating apparatus for receiving the uncorrected pressure signal and the temperature signal and producing the corrected pressure signal, the corrected pressure signal having:
  a) all sensor errors with respect to temperature removed therefrom caused by the temperature sensitivity of the pressure sensing unit;
  b) all said first remote seal errors with respect to temperature removed therefrom caused by the temperature sensitivities of the first remote seal and the second remote seal; and
  c) all vertical height errors with respect to temperature removed therefrom, wherein the vertical height errors with respect to temperature are a product of the vertical distance, the change in temperature, and a fluid properties factor indicative of the properties of the pressure transmitting fluid.

11. The transmitter of claim 10 wherein fluid properties factors include a specific gravity factor indicative of the fluid's change in specific gravity as a function of changes in temperature.

12. The transmitter of claim 11 wherein the temperature compensating apparatus is a processor.

13. The transmitter of claim 11 wherein the temperature compensating apparatus is a logic circuit.

* * * * *